Aug. 2, 1966    J. W. HENDRY    3,263,278
COMBINED HEATER AND FEEDER RAM
Filed Sept. 5, 1963    2 Sheets-Sheet 1
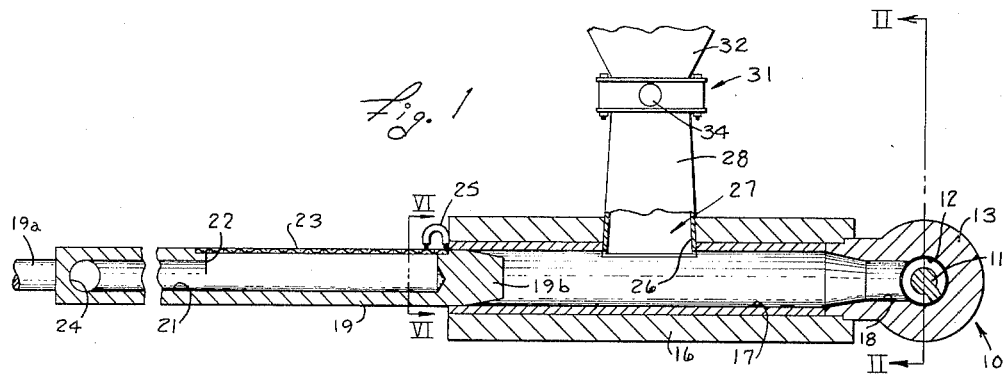
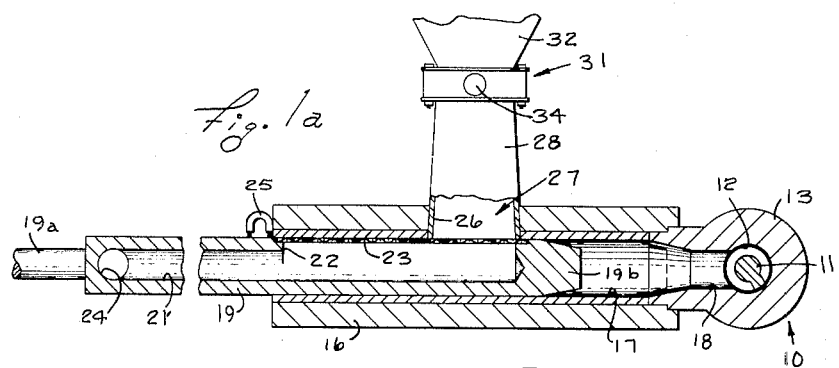
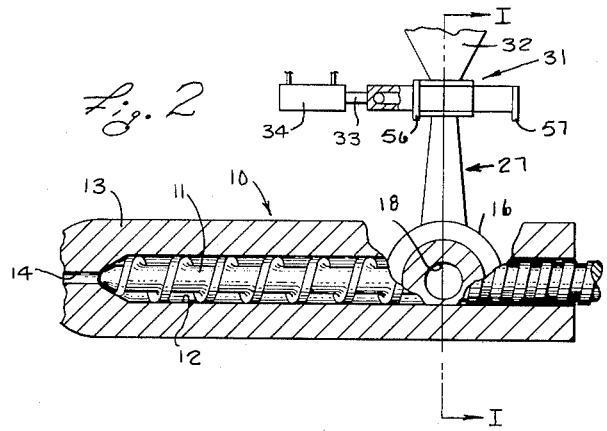
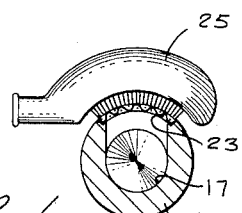
INVENTOR.
JAMES W. HENDRY
BY
Woodhams, Blanchard & Flynn
ATTORNEYS INVENTOR.
JAMES W. HENDRY
BY
Woodhams, Blanchard & Flynn
ATTORNEYS

United States Patent Office

3,263,278
Patented August 2, 1966

3,263,278
COMBINED HEATER AND FEEDER RAM
James W. Hendry, Scottsburg, Ind., assignor to Borg-Warner Corporation, Chicago, Ill., a corporation of Illinois
Filed Sept. 5, 1963, Ser. No. 306,745
13 Claims. (Cl. 18—30)

This invention relates to heating and feeding devices for plasticizing machines and, more particularly, relates to a device for preheating plasticizable material prior to the feeding thereof to a plasticizing machine.

Many systems are currently known for heating plastic material prior to the injection of same into a mold. Often in the past the heat supplied to the plastic material has been supplied either entirely through agitation and the resulting internal friction in a plasticizing screw chamber or partly by frictional heat and partly by externally applied heat. However, both of these methods are expensive and slow and require a large screw and screw chamber. Often several shots of the plastic material are contained in the screw in order to heat the material sufficiently to render it capable of being injected into a mold or of being extruded through a die. For this and other reasons well recognized in the industry, supplying in the screw chamber the totality of heat required to the plastic material is not always desirable and, thus, ways have been introduced into the art for preheating the plastic material prior to the placement of same in the screw chamber.

Prior preheating devices have been faced with the problem of providing uniform heat through the body of plastic material, which problem is made more difficult by the low conductivity of heat in plastic. Previous attempts at preheating have included the use of dielectric heating which has generally been unsatisfactory from the standpoint of versatility and expense. Heating with hot air has also been attempted but previous devices have tended to melt the outer portions of the mass of plastic before uniform heating was obtained and have, therefore, been unsatisfactory. Other previous devices have combined hot air heating with mechanical agitation of various types and these have been generally unsatisfactory because of their complexity and for a variety of other reasons.

Thus, the objects of this invention include:

(1) To provide an improved device for heating plastic material prior to the introduction thereof into a molding machine.

(2) To provide a device for preheating plastic material whereby the screw and screw chamber of the molding machine can be made smaller, simpler and more economically than in cases where said molding machine, especially the screw thereof, supplies the totality of heat required to fully plasticize the plastic material.

(3) To provide a device, as aforesaid, which heats the plastic material uniformly and quickly enough to feed an automatic molding machine.

(4) To provide a device, as aforesaid, incorporating a ram device for feeding preheated plastic material into a molding machine.

(5) To provide a device, as aforesaid, wherein heated air provides preheating to the plastic material prior to the introduction thereof into the molding machine.

(6) To provide a device, as aforesaid, which may be fully automatically operated, which may be added with a minimum of cost and alterations to existing molding machines and which, more specifically, may be incorporated into existing feeding devices for such machines or which may replace such existing feeding devices with a minimum of installation effort.

(7) To provide a device, as aforesaid, which may be made with a minimum number of parts with relatively simple tools and at a minimum of cost and which employs either commercially available or easily fabricated parts.

(8) To provide a device, as aforesaid, which is capable of manufacture in a wide variety of sizes and shapes for adaptation to a wide range of capacity and installation requirements.

(9) To provide a device, as aforesaid, which is simply and ruggedly constructed, which will require little or no maintenance over a long life and which may be replaced as a unit if desired.

(10) To provide a device, as aforesaid, which when manually operated requires little or no additional training of the machine operator and which is easily adapted to automatic molding machines, integrating therewith with only few and minor changes in the control system of said machine.

Other objects and purposes of the invention will be apparent to those acquainted with devices of this type upon reading the following specification and inspecting the accompanying drawings.

In the drawings:

FIGURE 1 is a fragmentary, partially broken view taken axially of the screw chamber of the molding machine to which the device embodying the invention is attached and substantially taken on the line I—I of FIGURE 2.

FIGURE 1a is a view similar to FIGURE 1 but showing the parts thereof in different positions.

FIGURE 2 is a partially broken, fragmentary, sectional view taken on the line II—II of FIGURE 1.

FIGURE 6 is a sectional view taken on the line VI—VI of FIGURE 1.

*General description*

Figure 3:
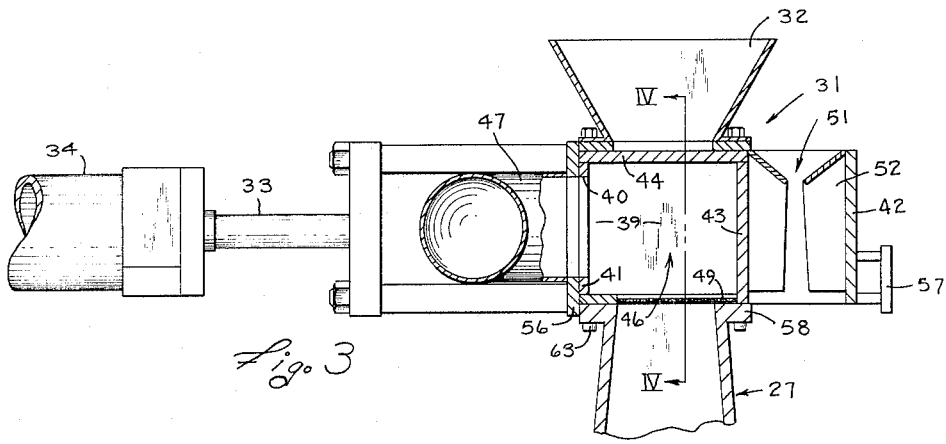
FIGURE 3 is an enlarged fragmentary view of a portion of the apparatus appearing in FIGURE 2.

Generally, the objects of this invention are met by providing a material feeding ram in a ram cylinder communicating with a molding machine such as with the screw chamber of an injection machine having screw-type preplasticizing. The ram has an axially extending passage therein which at one end opens through the circumferential wall of the ram near the plastic driving end thereof and which at its other end opens through said circumferential wall near the other end of the ram. The first-named opening is covered by suitable perforated means, such as screening, to allow a flow of air therethrough and simultaneously to block passage therethrough of plastic particles. The outlet end of a preheating chamber opens through the peripheral wall of the ram cylinder intermediate the ends thereof whereby when said ram is in a position approaching the molding machine, said preheating chamber communicates through said screen into the axial passage in said ram. A suitable trap or valve is placed at the upper end of said preheating chamber and in one position allows passage into said preheating chamber of plastic particles from a suitable source. In the other position of said trap, particles from said source are barred from said chamber and heated air is passed into and through said preheating chamber, through said screen and into said axial passageway, thence out through the outlet therefrom.

*Detailed description*

Certain terminology will be used in connection with the following description for convenience in reference only and will be understood as having no limiting significance. For example, the terms "upwardly" and "downwardly" will be used with reference to the normal position of the apparatus as shown in FIGURES 1 and 2. The terms "rightwardly" and "leftwardly" will be used with reference to the drawings in connection with which such terminology is used. The terms "inwardly" and "outwardly" will refer to directions toward and away from the geometric center of the apparatus and of parts thereof under discussion. Such terminology will also include derivatives of the words above expressly mentioned and words of similar import.

Turning now to FIGURES 1 and 2, there is disclosed a plasticizing machine 10. The machine contains plasticizing means such as a screw 11 which may be of any desired type and which is preferably rotatable within the central chamber 12 of a plasticizing cylinder 13. The output end of the central chamber 12 (leftward as seen in FIGURE 2) connects through a passageway 14 to any convenient molding or extrusion device, not shown. The plasticizing screw 11 is rotatably driven, and may in addition in some cases be reciprocably driven, by any convenient means, not shown.

The feeding device includes a ram cylinder 16 which defines a preferably coaxial central opening 17 which latter communicates through a port 18 with the central chamber 12 of the plasticizing 13. The ram cylinder 16 houses an elongated ram 19 which is reciprocably driven at its axially outer end 19a by any convenient means such as a fluid pressure cylinder, not shown.

The ram 19 has an elongated, preferably coaxial, passageway 21 therein extending from a point close to but spaced axially from the inner end 19b of the ram 19 to a point near the axially outer end of said ram. The axially inner end of the passageway 21 opens at 22 through the circumferential wall of the ram 19 and a perforated cover, such as the screen 23, is affixed to said circumferential wall in any convenient manner whereby to cover said opening 22. The screen 23 is suitably pierced to permit a flow of air therethrough but not to admit particles of plastic material therethrough. The axially outer end of the passage 21 is provided with an exhaust port 24 through the circumferential wall of the ram 19 for bringing the passage 21 into communication with the atmosphere, or into communication with suitable reheating and recycling means. A vacuum brush 25 (FIGURES 1 and 6) is fixed at the leftward end of the cylinder 16 and connects to a suitable vacuum source, not shown, for removing the fines from the screen 23.

The circumferential wall of the ram cylinder 16 is pierced by an inlet opening 26 which is in registry with a preferably upwardly extending preheating chamber 27 defined by side walls 28. The inlet opening 26 is preferably spaced intermediate the ends of the ram cylinder 16 whereby when the ram 19 is in its axially outermost position as shown in FIGURE 1, said ram will be axially outward of said inlet opening 26 and when the ram 19 is in axially inward, or machine feeding, positions (both the solid line and broken line positions shown in FIGURE 1a) the inlet opening 26 will communicate with the passage 21 through the screen 23. Thus, warm air can pass between the preheating chamber and the interior of the ram through at least a major part of the feeding cycle of the ram 19.

The walls 28 of the preheating chamber 27 are fixed by any convenient means, not shown, to the ram cylinder 16. The upper end of the preheating chamber 27 is in communication with, through a suitable trap or valve device generally indicated at 31 and hereinafter described, the output end of a suitable material feeding device such as a hopper 32.

Turning now to the trap 31 (FIGURE 3) in more detail, said trap is reciprocable transversely of the hopper 32 and preheating chamber 27 by any convenient means, here shown as the rod 33 of a pressure fluid cylinder 34. The trap 31 may be of many possible designs but in this particular embodiment the trap comprises a pair of preferably parallel and upstanding side walls 38 and 39 connected at their opposite ends by a pair of preferably parallel upstanding end walls 41 and 42 and between their ends by an intermediate wall 43 which is preferably parallel to said end walls. A top plate 44 extends between the side walls 38 and 39 and the leftward end wall 41 and the intermediate wall 43 adjacent the top edges thereof for defining therewith an air chamber 46. When the trap 31 is in its rightwardmost position, the top plate 44 closes the bottom of the hopper 32 to prevent egress of plastic material therefrom. An air inlet pipe 47 from any convenient source of heated, forced air, not shown, is connected through an opening 40 in the leftward end wall 41 to the air chamber 46. The bottom of the air chamber 46 is closed with a suitable screen 49 which is capable of transmitting air therethrough and when the trap 31 is in its rightwardmost position as shown in FIGURE 3, the air chamber 46 communicates through the screen 49 with the upper end of the preheating chamber 27. The screen 49 prevents plastic particles in the preheating chamber 27 from entering the air chamber 46. The screen 49 may be fixed in the air chamber 46 by any convenient means but is here shown for purposes of illustration as having an upturned edge on the periphery thereof which is entered between the walls of the air chamber 46 and suitable retainer bars 50 which are joined to said walls by screws 48.

The space between the intermediate wall 43 and the rightward wall 42 (FIGURE 3) defines, with the side walls 38 and 39, a vertically open material passage 51. The material passage 51 may, if desired, include suitable baffling generally indicated at 52 for directing and controlling the flow of plastic material therethrough. It will be noted that reciprocation of the trap 31 leftwardly from its position shown in FIGURE 3 places the material passage 51 in alignment with the preheating chamber 27 and the hopper 32 whereby to admit plastic material from said hopper into said preheating chamber. Suitable lugs 56 and 57 depend from the end walls 41 and 42, respectively, and cooperate with suitable flange means 58 on the upper end of the preheating chamber 27 to limit the reciprocal movement of the trap 31.

Figure 4:
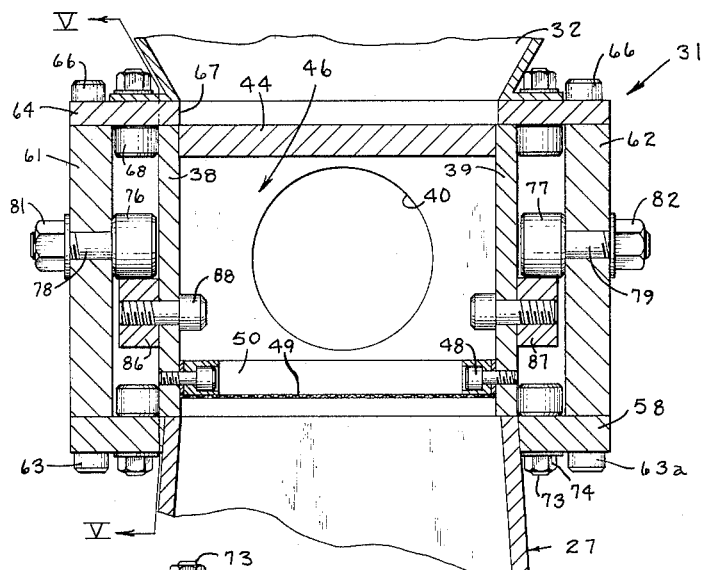
FIGURE 4 is an enlarged sectional, fragmentary view taken on the line IV—IV of FIGURE 3.
Figure 5:
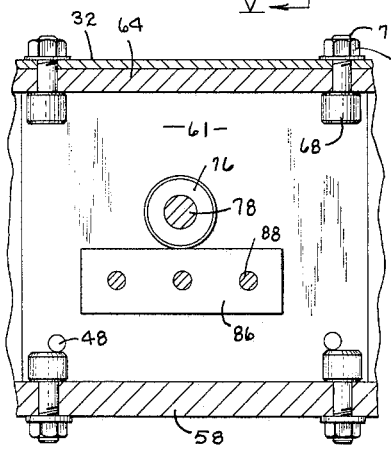
FIGURE 5 is a fragmentary, enlarged, sectional view taken on the line V—V of FIGURE 4.

The trap device 31 may be constrained for reciprocation between the hopper 32 and preheating chamber 27 by any convenient means such as the means hereinafter described. A pair of side retainer plates 61 and 62 (FIGURE 4) are preferably parallel to and spaced outwardly from the side walls 38 and 39 of the trap 31 and are secured upon the top of the flange 58 of the preheating chamber 27 by means such as the screws 63 and 63a. The retainer plates 61 and 62 are preferably equal in length to the sides of the flange 58 adjacent to the side walls 38 and 39. A header plate 64 is fixed by screws 66 to the tops of the retainer plates 61 and 62. Hence, the trap 31 is vertically constrained between the flange 58 and the header plate 64. The header plate 64 has a cutout portion 67 which communicates with the hopper 32. A plurality, preferably four, of rotatable rollers 68 are secured to the header plate 64 and to the flange 58 by studs 73 and nuts 74 so that said rollers contact the outer surfaces of the side walls 38 and 39 of the trap 31 to limit the path of reciprocation thereof to a horizontally nondiverging path. Rollers 76 and 77 are rotatably mounted on the inner surfaces of the retainers 61 and 62, respectively, by means of the studs 78 and 79 and nuts 81 and 82. The radially outer surfaces of said rollers bear upon the upper surfaces of horizontal travel bars 86 and 87, respectively, which are mounted by screws 88 upon the outer faces of the respective side walls 38 and 39 of the trap 31. The rollers 76 and 77 and travel bars 86 and 87 firmly press the trap 31 upon the upper surface of the flange 58 when the air chamber 46 is located over preheating chamber 27 to prevent leakage of air and agitated plastic particles between the flange 58 and the walls of the air chamber 46.

Should it be desired, the path defining structure for the trap 31 may be considerably simplified, though with increased friction, by moving the retainer plates 61 and 62 inwardly into sliding contact with the side walls 38 and 39 and by elimination of the rollers 76 and 77 and the set of rollers 68.

*Operation*

Although the operation of the device has been indicated somewhat above, it will be further detailed hereinbelow for purposes of clear understanding.

Assuming the hopper 32 to be charged with particles of plastic material to be preheated, the trap 31 is moved leftwardly from the position of FIGURES 2 and 3 to connect the hopper 32 to the preheating chamber 27 through the material passage 51 in the trap 31. Thus, material from the hopper 32 falls past the baffles 52 and into the preheating chamber 27. The ram 19 is required to be in an inward position, that is, anywhere in the range of positions including and between the solid line and broken line positions of FIGURE 1a, whereby the screen 23 blocks the lower end of the preheating chamber 27 and, hence, prevents escape of the particles of plastic material therefrom. With a source of warmed air connected to the air pipe 47, the pressure fluid cylinder 34 is energized so that the rod 33 thereof moves the trap 31 rightwardly to its position shown in FIGURES 2 and 3 whereby to remove the material passage 51 from between the hopper 32 and preheating chamber 27 and to substitute in place thereof the air chamber 46. Thus, forced heated air from the pipe 47 travels through the air chamber 46 and into the preheating chamber 27 where said air warms the plastic material in said preheating chamber. The air then passes through the screen 23, through the passage 21 in the ram 19 and out the exhaust port 24 which may be directly connected to the atmosphere or which may be connected to further exhaust or recycling passage means, not shown.

After a suitable period of preheating, the ram 19 is moved outwardly (leftwardly) to the FIGURE 1 position, namely, sufficiently that the inner end 19b thereof clears the inlet opening 26 of the ram cylinder 16. Thus, the preheated plastic material in the preheating chamber 27 is allowed to fall downwardly under the influence of gravity into the ram cylinder 16. The flow of heated air through the pipe 47 may be shut off with the outward movement of the ram 19 is desired but such shut-off is not necessary, except for cost-saving purposes, in that the air causes no deleterious effects. With the emptying of the preheating chamber 27 into the central opening 17 of the ram cylinder 16, the ram 19 may be moved inwardly (rightwardly) to inject the plastic material into the screw chamber 12, preferably with the screw 11 rotating therein, which screw then operates upon the plastic material in a conventional and well-known manner.

When the ram 19 reaches its solid line, FIGURE 1a, position it again places the screen 23 across the opening 26 and again permits passage of warming gas therethrough. Thus, a new batch of material may enter the preheating chamber and the warming thereof commence while the ram 19 is completing its feeding operation, the same being accomplished substantially at the broken line position of FIGURE 1a.

The integration of suitable controls for the devices reciprocating the trap 31 and ram 19 with the control system of the plasticizing machine for providing the desired degree of automation of the total machine will be obvious to those with average skill in the art and will not be further detailed here.

Although a particular embodiment of the invention is disclosed hereinabove for purposes of illustration, it will be understood that variations or modifications of such disclosure lying within the scope of the appended claims are fully contemplated.

What is claimed is:

1. In a preheating device for a plasticizing machine, the combination comprising:

hopper means adapted for containing a supply of plastic material, said hopper means having a discharge end;

preheating chamber means having an inlet opening below said discharge end of said hopper means;

trap means mounted between said discharge end of said hopper means and said inlet opening of said preheating chamber means and means supporting said trap means for movement with respect to and between said hopper means and said chamber means, said trap means having a fluid flow chamber having an opening adapted to overlie said inlet opening, said trap means also having a material flow passageway which is open at its opposite ends, which ends are adapted to simultaneously register with said discharge end and said inlet opening so that plastic material can flow from said hopper means into said chamber means, said fluid flow chamber and said material flow passageway being spaced from and isolated from each other;

means for connecting said fluid flow chamber to a source of heated fluid; and means for moving said trap means to alternatively connect said fluid flow chamber to said inlet opening and said material flow passageway to both said discharge end and said inlet opening.

2. The device defined in claim 1 wherein said fluid flow chamber is closed at the top and three sides thereof and communicates with said fluid source at the remaining side thereof, said opening for communicating with said preheating chamber means being in the bottom side thereof of said chamber; and wherein said material flow passageway is closed on all sides thereof, is open at the top and bottom thereof and is fixed to and laterally aligned with said fluid flow chamber.

3. The device defined in claim 1 wherein the bottom side of said fluid flow chamber is open and wherein perforated means is affixed across said open bottom side whereby to allow the flow of fluid through said perforated means but to prevent plastic material from entering said fluid flow chamber from said preheating chamber means.

4. The device defined in claim 1 wherein said trap means includes a pair of upstanding side walls, a pair of upstanding end walls and an upstanding intermediate wall, said fluid flow chamber being defined by said side walls, said intermediate wall and one of said end walls and said material passageway being defined by said side walls, said intermediate wall, and the other of said end walls and including a top wall closing the upper end of said fluid flow chamber.

5. The device defined in claim 1 wherein said trap means is supported for reciprocable movement;

wherein said preheating chamber supports at the top thereof a pair of parallel, fixed, upstanding guide walls which are parallel to the direction of reciprocation of said trap means;

wherein said guide walls support guide means; and wherein guide means on said guide walls cause said trap to be movable along a straight line.

6. The device defined in claim 5 wherein said trap means includes a pair of upstanding, essentially parallel, side walls;

said guide means comprising a plurality of rollers tangential in contact with said side walls of said means adjacent the top and bottom edges thereof;

horizontal travel bars fixed respectively to said side walls of said trap means and said guide walls each carrying a further roller rotatable about an axis perpendicular to said guide walls and bearing at their lowest radial extents upon said horizontal travel bars;

said travel bars being centered on said fluid flow chamber and extending partway therealong whereby when said trap means is reciprocated to bring said fluid flow chamber into communication with said preheating chamber means, the bearing of said further rollers upon said travel bars urges the bottom edges of said side walls into firm, essentially leak-proof contact with the top of said preheating chamber means whereby to minimize leakage of fluid and material between said trap means and said preheating chamber means.

7. In a combined preheating and feeding device for a plastic utilizing machine, the combination comprising:
a plastic utilizing machine;
a ram cylinder having a discharge opening and means connecting said discharge opening to said plastic utilizing machine;
means defining an inlet opening in the side of said ram cylinder spaced from said discharge opening;
means defining a heating chamber having a supply opening and an outlet opening, said outlet opening of said heating chamber being connected to said inlet opening of said ram cylinder;
supply means adapted for containing a supply of plastic material;
means defining a first passage between said supply means and said supply opening;
gas flow means and means for alternatively connecting said first passage and said gas flow means to said supply opening;
a ram reciprocable within said ram chamber, ram having a passageway one end of which extends through the side of the ram intermediate the axial ends of the ram, said passageway extending axially through the ram and then venting externally of said ram at the end thereof remote from said plastic utilizing machine;
foraminous means across said one end of said passageway permitting the flow of warming fluid therethrough but preventing the passage of plastic material therethrough;
whereby when said ram is in position such that said one end of said passageway is in registry with said outlet opening of said heating chamber, warming fluid may pass through said heating chamber, said gas flow means and said passageway in said ram whereby said plastic material can be warmed and, when said ram is in a different position, plastic material may pass through said outlet opening into said ram chamber in position for movement by said ram from said ram chamber into said plastic utilizing machine.

8. An apparatus for preheating and feeding plastic material comprising:
a hopper for holding a supply of plastic material, said hopper having a discharge end;
a ram cylinder having a reciprocable ram therein, said ram cylinder having an inlet opening in the side thereof and an outlet opening at one end thereof, and means for moving said ram within said ram cylinder from a position adjacent the opposite end of said ram cylinder across said inlet opening toward said one end of said ram cylinder and return;
an elongated preheating chamber extending between said discharge end of said hopper and said inlet opening of said ram cylinder;
valve means between said preheating chamber and said discharge end of the hopper, said valve means including passage means for permitting plastic material to flow from said hopper into said preheating chamber, means for blocking flow of plastic material from said hopper and gas flow means for permitting heated gas to flow through said preheating chamber, said gas flow means being coupled with said blocking means so that said gas flow means communicates with said preheating chamber when said blocking means blocks flow of plastic material from said hopper;
said ram having an elongated passageway, one end of which opens through the side of said ram for communication with said inlet opening and the other end of which extends along the ram;
a foraminous material covering said one end of said passageway so that plastic material in said preheating chamber is prevented from entering said passageway;
a source of heated gas connectible to one of said gas flow means and said other end of said passageway, the other of said gas flow means and said other end of said passageway being connectible to exhaust;
whereby when said ram is positioned so that one end of said passageway communicates with said inlet opening, and said valve means is positioned so that gas flow means communicates with said preheating chamber, heated gas can flow tbetween said gas flow means and said passageway in order to heat plastic material in said preheating chamber and, following retraction of said ram and entry of the plastic material into said ram cylinder, said ram can be advanced to discharge the heated material from said ram cylinder through said outlet opening.

9. In a combined preheating and feeding device for a machine for utilizing plastic material, the combination comprising:
a machine for utilizing plastic material;
means defining an elongated preheating chamber having an inlet opening and a discharge opening;
supply means adapted for containing a supply of plastic material;
first gas flow means;
means for alternatively placing said supply means and said first gas flow means in communication with said inlet opening;
means defining a passage leading from said discharge opening to said machine;
an element slidably disposed in said passage, said element having passageway means associated therewith and providing second gas flow means;
means for moving said element back and forth in said passage between a first position in which said passageway means is in communication with said discharge opening and a second position in which said element blocks communication between said passageway means and said discharge opening; and
means for connecting one of said gas flow means to a source of heating fluid and means for connecting the other of said gas flow means to exhaust.

10. A combined preheating and feeding device according to claim 9, in which said element is an elongated ram supported for reciprocation in said passage, said passageway means being provided by an elongated passageway extending lengthwise in said ram.

11. A combined preheating and feeding device according to claim 1, in which said passageway in said ram has one end which extends through the side of the ram between the axial ends of the ram, said passageway extending axially through said ram and then venting externally of said ram at the end thereof remote from said machine; and foraminous means extending across said one end of said passageway for permitting the flow of heating fluid therethrough but preventing the passage of plastic material therethrough.

12. In a combined preheating and feeding device for a machine for utilizing plastic material, the combination comprising:
a machine for utilizing plastic material;

means defining an elongated preheating chamber having an inlet opening and a discharge opening;

supply means adapted for containing a supply of plastic material;

movable means mounted between said supply means and said inlet opening, said movable means including means defining first passage means for connecting said supply means to said inlet opening, first gas flow means and means for isolating said inlet opening from said first passage and simultaneously connecting first gas flow means to said inlet opening;

means for moving said movable means for alternatively connecting said first passage means and said first gas flow means to said inlet opening;

means defining second passage means leading from the discharge opening to said machine;

second gas flow means and means for alternatively connecting said second passage means and said second gas flow means to said discharge opening; and means for connecting one of said gas flow means to a source of heating fluid and means for connecting the other of said gas flow means to exhaust.

13. In a combined preheating and feeding device for a plastic utilizing machine, the combination comprising:

a plastic utilizing machine;

means defining an elongated preheating chamber having an inlet opening and a discharge opening;

supply means adapted for containing a supply of plastic material;

means defining a first passage between said supply means and said inlet opening;

first gas flow means and means for alternatively connecting said first passage and said first gas flow means to said inlet opening;

a ram cylinder communicating at one end thereof with said machine and communicating intermediate the ends thereof with said discharge opening of said preheating chamber;

a ram reciprocable within said ram cylinder and providing movable closure means for closing said discharge opening of said preheating chamber, said ram having a passage therein communicating at one end thereof with vent means and at the other end thereof communicating through the circumferential wall of said ram, said passage in said ram providing second gas flow means;

a screen covering said other end of said passage in said ram, whereby when said ram is in one position, said preheating chamber connects through said ram cylinder with said machine and when said ram is in a second position, said screen blocks movement of material from said preheating chamber into said ram cylinder but allows flow of fluid in said preheating chamber; and means for connecting one of said gas flow means to a source of heating fluid and means for connecting the other of said gas flow means to exhaust.

References Cited by the Examiner
UNITED STATES PATENTS

| | | | |
|---|---|---|---|
| 2,448,947 | 9/1948 | Arthur et al. | 18—30 |
| 2,523,137 | 9/1950 | Nichols et al. | |
| 3,163,888 | 1/1965 | Shattuck | 18—30 |

WILLIAM J. STEPHENSON, *Primary Examiner.*

J. SPENCER OVERHOLSER, *Examiner.*

L. S. SQUIRES, *Assistant Examiner.*